April 9, 1946.  J. H. HERMANSON  2,398,306
SAFETY CLAMP FOR SCAFFOLDS
Filed Jan. 30, 1945
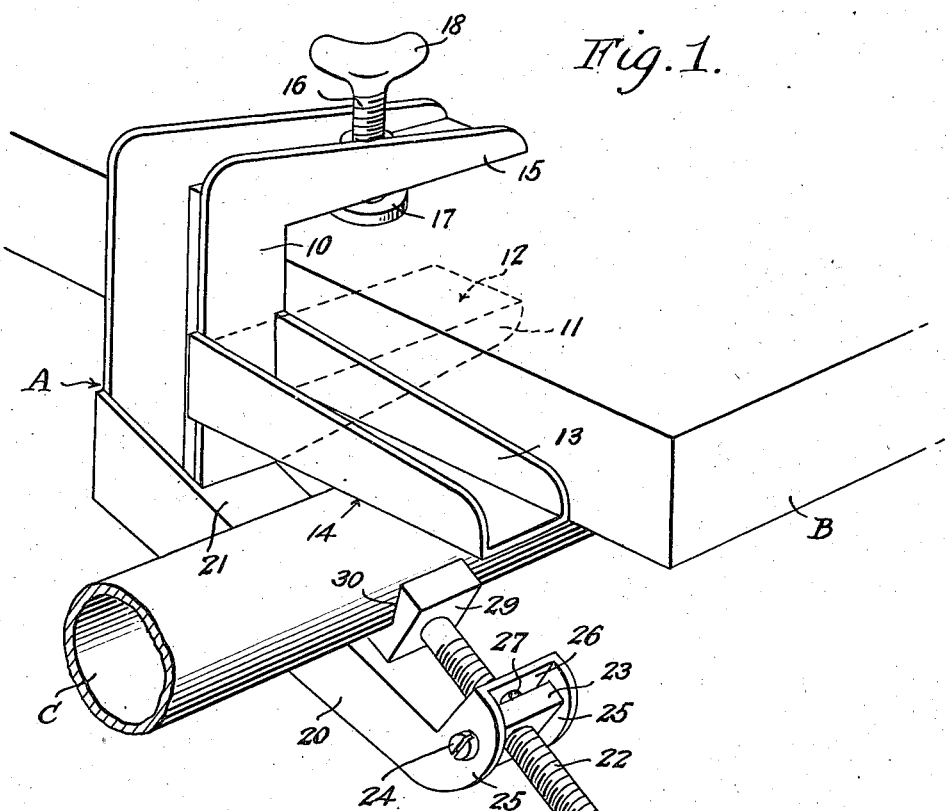
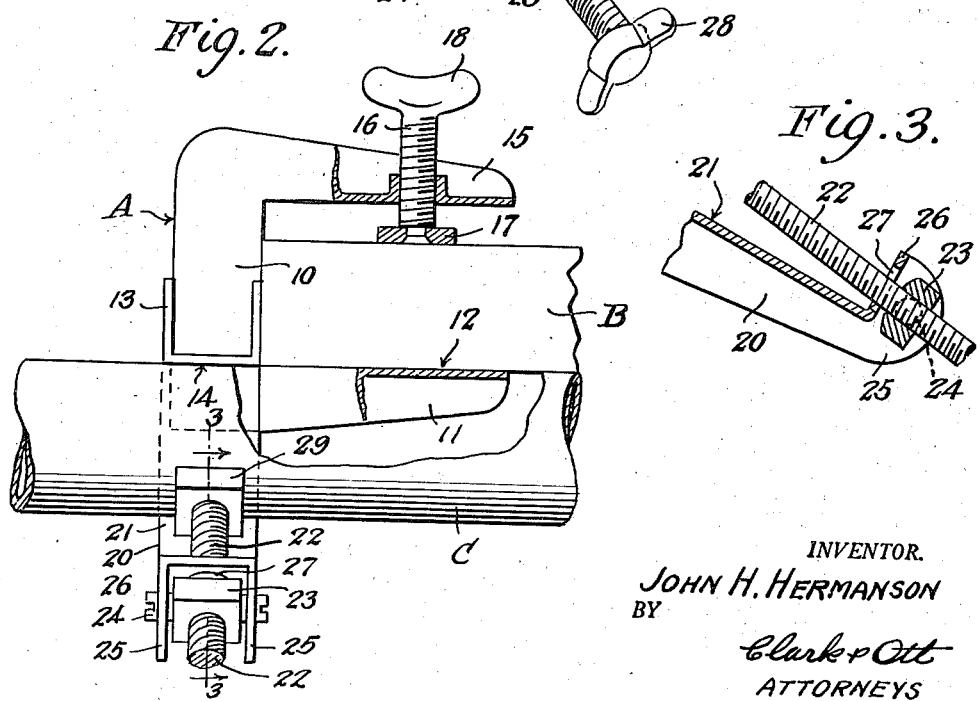
INVENTOR.
JOHN H. HERMANSON
BY
Clark & Ott
ATTORNEYS Patented Apr. 9, 1946

2,398,306

UNITED STATES PATENT OFFICE 2,398,306

SAFETY CLAMP FOR SCAFFOLDS

John H. Hermanson, Brooklyn, N. Y.

Application January 30, 1945, Serial No. 575,329

2 Claims. (Cl. 304—40)

This invention has general reference to clamping devices and, while not necessarily restricted to such use, the same is particularly useful as a safety clamp for securing the plank flooring of a pipe scaffolding or staging to the horizontal pipe sections thereof so as to avoid slipping or displacement thereof which has heretofore resulted in serious and sometimes fatal injuries to workmen.

The invention broadly comprehends a two-way clamping device for securing together in crossed contiguous relation cylindrical and flat faced members such as the planks and pipe sections of scaffolding, which device essentially embodies a pair of angularly related jaws respectively having bearing faces disposed in the same plane for engagement with the contiguous surfaces of the members, together with means for clamping the members respectively to said jaws to retain the members in associated relation.

More particularly, the invention resides in an improved safety clamp of the indicated character which includes pairs of clamping means disposed in angular relation to each other for respectively clamping the device to the members and the members to each other and wherein the means for clamping a cylindrical member or pipe is so constructed as to accommodate members of varying diameters and to effectively retain the same in contiguous crossed relation with the other member.

Other objects are to provide a safety clamp of the type specified which is comparatively simple in its construction and mode of use, which may be economically produced and which is highly efficient for its intended purpose.

With the above enumerated and other objects in view, the invention is set forth in greater detail in the following specification, particularly pointed out in the appended claims and illustrated in the accompanying drawing, in which:

Fig. 1 is a perspective view of a safety clamp constructed in accordance with the present invention and showing the same in clamped relation with a pipe section and the plank flooring of a pipe scaffolding or staging.

Fig. 2 is a side view thereof with parts broken away and shown in section to disclose the underlying structure.

Fig. 3 is a fragmentary sectional view, taken on the line 3—3 of Fig. 2.

Referring to the drawing, the clamping device is specifically shown as adapted to its principal use as a safety clamp A for retaining a flooring plank B in crossed relation resting upon the horizontal pipe section C of a pipe scaffolding or staging, it being understood however that within the scope of the invention the reference characters B and C may represent any equivalent flat faced and cylindrical members for any purpose which are arranged in any position.

The clamp A includes a shank 10 which is preferably channel-shaped in cross-section, as shown, and which shank has permanently fixed thereto and projecting outwardly from one side thereof a jaw 11 having a bearing face 12. A second jaw 13 is permanently fixed to project from an adjacent side of the shank 10 in approximately right angular relation to the jaw 11 and said jaw 13 is formed with a bearing face 14 which is disposed in the same plane with the bearing face 12 of the jaw 11 so that said bearing faces 12 and 14 may respectively contact with the contiguous surfaces of the crossed members B and C, which in the present disclosure are the flat under face of the flooring plank B and the upper portion of the periphery of the pipe section C.

Any suitable means is carried by the shank 10 for engagement with the opposite or upper flat face of the flooring plank or member B to clamp the lower face thereof against the upper bearing surface 12 of the jaw 11. As shown, said means consists of a jaw 15 integral with or otherwise fixed permanently to the upper end of the shank 10 and projecting outwardly therefrom in the same direction as and in alignment with and spaced above the jaw 11, with a clamping screw having a screw shank 16 threadedly engaged through the jaw 15 and provided with a swiveled head 17 at its lower end, a winged manipulating head being formed at the upper end thereof.

The device further includes another jaw 20 permanently fixed to the lower end of the shank 10 and projecting outwardly therefrom in the same direction as and spaced below the jaw 13 in vertical alignment therewith, said jaw 20 being formed with a declining upper bearing face 21 which diverges outwardly with reference to the face 14 to define a substantially V-shaped crotch for the accommodation of cylindrical members or pipes C of varying diameters. In order to urge the jaws 13 and 20 into close contact with the periphery of the member C and to retain the same in straddling relation therewith, suitable thrust means is provided which consists of a screw shank 22 threadedly engaged through a nut 23 fulcrumed to swing on trunnion screws 24 extending through the opposite side flanges 25 of the terminal web 26 at the free outer end of the jaw 20. The screw shank 22 extends through a slot 27 in the terminal web 26 and is formed at its outer end with a winged manipulating head 28, while the inner end thereof has swiveled thereto a thrust head 29 formed on its outer face with a V-shaped notch 30 for engagement with the convex periphery of the member C. This construction and arrangement permits the screw shank 22 and its thrust head 29 to be rocked to a position whereby it may exert an inward radial thrust on the cylindrical member C, irrespective of the size of its diameter.

What is claimed is:

1. In a clamp for securing together flat faced and cylindrical members in crossed contiguous relation, a shank, a pair of angularly related jaws permanently fixed to and projecting outwardly from the shank and having bearing faces disposed in the same plane and respectively engaging the contiguous surfaces of the members, means carried by said shank in alignment with one of the jaws for clamping the flat faced member against the bearing face of said one jaw, a third jaw permanently fixed to the shank and disposed in alignment with the other jaw and having a bearing face confronting and diverging outwardly with reference to the bearing face of said other jaw to define a crotch fitted over the cylindrical member, and adjustable means carried by the terminal of one of the divergent jaws and engagable with the cylindrical member for drawing the divergent jaws into straddled frictional contact with the periphery of said cylindrical member.

2. In a clamp for securing together flat faced and cylindrical members in crossed relation, a shank, two pairs of jaws mounted on said shank, one of said pairs of jaws being angularly disposed with reference to the other pair and having a bearing face disposed coplanar with the bearing face of one of the jaws of the other pair, said coplanar bearing faces being adapted to respectively engage the contiguous surfaces of the flat faced and cylindrical members, a jaw of one of the pairs of jaws having a bearing face diverging outwardly with reference to the other jaw of said pair and adjustable means carried by one of the jaws of each pair for engaging the said members respectively for clamping the same against said coplanar bearing faces and one of the members against said diverging face.

JOHN H. HERMANSON.